June 9, 1953  D. LABINO  2,641,454
APPARATUS AND METHOD FOR MIXING MOLTEN GLASS
Filed Jan. 27, 1951
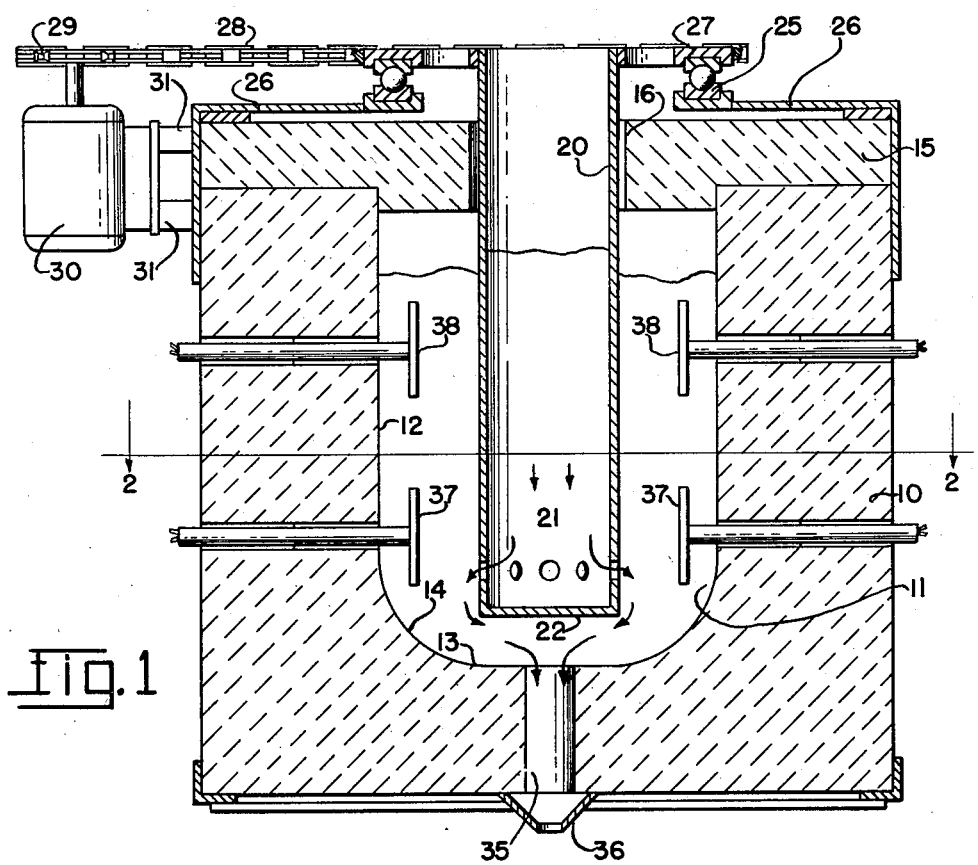
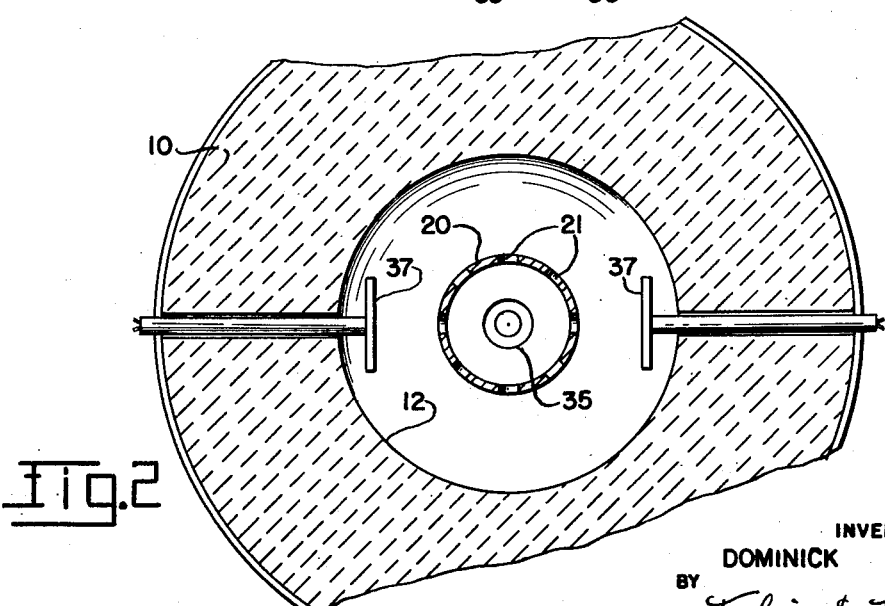
INVENTOR
DOMINICK LABINO
BY
Toulmin & Toulmin
ATTORNEYS Patented June 9, 1953

2,641,454

UNITED STATES PATENT OFFICE 2,641,454

APPARATUS AND METHOD FOR MIXING MOLTEN GLASS

Dominick Labino, Maumee, Ohio, assignor to Glass Fibers, Inc., Waterville, Ohio, a corporation of Ohio Application January 27, 1951, Serial No. 208,126

11 Claims. (Cl. 259—8)

1

This invention relates to homogenizers, particularly adapted for intimately mixing molten glass to obtain uniform homogeneity of the mass.

In the manufacture of glass utilized for the production of other glass products, particularly continuous length glass filaments, it is essential that the glass that goes into the product be of extremely uniform character throughout the mass of glass to provide for uniform characteristics in the glass product. This is particularly important in the manufacture of continuous length glass filaments utilized in the production of thread and yarn because of the extremely small diameters of the filaments, the average ranging between .0002 and .0003 inch. If the glass that goes into the making of glass fibers or filaments is not of uniform character, then the filaments are highly susceptible to breakage, whereby loose ends become present in the finished thread or yarn product, and these loose ends are not desirable from the standpoint of the strength of the thread, and from the standpoint of causing a prickly sensation when the thread is brushed against the human skin.

It is, therefore, an object of this invention to provide a homogenizing apparatus that is particularly adapted for obtaining thorough mixing of molten glass that is discharged from a glass furnace, whereby glass of uniform character is obtained for manufacture of glass products, such as continuous length glass filaments.

It is another object of the invention to provide a homogenizing apparatus in accordance with the foregoing object, wherein the glass flow through the homogenizer is substantially unidirectional thereby eliminating stagnant masses of glass in the homogenizer which have their characteristics changed as a result of being retained under continuous heat over prolonged periods of time.

Still another object of the invention is to provide a homogenizing apparatus wherein the glass flow through the homogenizer is substantially unidirectional, but wherein the flow is disturbed in its movement through the homogenizer by a movement substantially normal to the primary flow imparted to the molten glass as it moves through the homogenizer whereby the dual flow action results in an intimate mixing of the glass in its flow through the homogenizer to obtain uniform homogeneity of the glass discharging from the homogenizer.

Still another object of the invention is to provide a homogenizing apparatus in accordance with any of the foregoing objects wherein the

2 molten glass moves through the homogenizer by a gravitational action in a continuous flow.

Another object of the invention is to provide a homogenizer incorporating any of the foregoing objects wherein the glass in the homogenizer is heated by flow of electric current through the body of the glass to control the temperature of the glass in the homogenizer.

Another object of the invention is to provide a homogenizer in which there is provided a rotating container that receives molten glass admitted to the homogenizer, whereby rotation of the container in a body of glass contained within the homogenizer results in intimate mixing of molten glass flowing from the container into the body of the glass in the homogenizer.

Further objects and advantages will become apparent from the drawings and the following description.

In the drawings:

Figure 1 is a vertical cross-sectional view of a homogenizer incorporating features of this invention.

Figure 2 is a horizontal cross-sectional view taken along line 2—2 of Figure 1.

The homogenizer of this invention is adapted for use in cooperation with a glass furnace so that glass discharged from a furnace in a continuous stream or in gobs will pass through the homogenizer that is located exteriorly of the furnace and thereby intimately mix the glass before it loses its molten condition. The temperature of the glass that is being mixed in the homogenizer can be controlled by heating devices to obtain the most satisfactory conditions for mixing of the glass. In fact, the temperature of the glass in the homogenizer can be elevated above the temperature of the glass in the furnace whereby to provide for elimination of occluded gas in the glass. The small quantity of glass present in the homogenizer relative to the mass in the glass furnace permits escape of occluded gas from the glass more readily.

In this invention the homogenizer consists of a ceramic body 10 that has a central chamber 11 formed therein. The central chamber 11 is circular in transverse cross-section and the side wall 12 thereof converges with the bottom wall 13 by means of the curved wall section 14. The ceramic body 10 is made of any suitable material capable of withstanding the temperatures of the molten glass without contamination of the glass. If desired, the chamber 11 can be constructed of a metal wall of suitable nature that is insulated against loss of heat in any conventional manner.

A cover 15 is placed upon the upper end of the ceramic body 10 and closes the top end of the chamber 11. The cover 15 has an opening 16 axial of the chamber 11.

A cylindrical sleeve 20 extends downwardly through the opening 16 in the cover 15 and into the chamber 11 axially thereof closely adjacent the bottom wall 13 of the chamber. The sleeve 20 has a plurality of openings 21 positioned near the closed bottom wall 22 of the sleeve 20, the openings 21 being arranged radially of the axis of the sleeve 20.

The sleeve 20 is adapted to be rotated within the chamber 11 and is thus rotatably supported by an anti-friction bearing 25 that is carried upon a suitable angle support 26 extending from the homogenizer body 10. A sprocket wheel 27 is secured to the upper end of the sleeve 20 and is supported upon the upper half of the anti-friction bearing 25, the lower half of the bearing 25 being supported upon the angle support structure 26.

The sprocket wheel 27 is engaged by a sprocket chain 28 that also connects with a sprocket wheel 29 secured on the shaft of the drive motor 30. The drive motor 30 is supported upon the angle structure 26 by means of bracket extensions 31. The motor 30 provides means to drive the sprocket wheel 27 and thereby rotate the sleeve 20 within the chamber 11 of the homogenizer.

The upper end of the sleeve 20 is open whereby to receive molten glass from a glass melting furnace which can be fed into the sleeve either in a continuous flow or in gobs. Molten glass entering the upper end of the sleeve 20 partially fills the sleeve and flows through the openings 21 into the chamber 11, thereby partially filling the chamber 11.

Molten glass flows from the chamber 11 through the discharge opening 35 in the bottom wall of the body 10 of the homogenizer and axially thereof and then passes through a funnel 36 to a suitable glass handling apparatus. The flow of glass through the sleeve 20 and the chamber 11 is regulated by the flow of glass from the glass melting furnace, the flow being controlled to such an extent as to not overfill the homogenizer.

The glass within the chamber 11 is heated by means of a pair of electrodes 37 placed on opposite sides of the chamber 11 equidistantly from the sleeve 20 whereby the electric current conducted through the molten glass between the electrodes 37 causes a uniform heating of the glass around the sleeve 20 by the resistance of the molten glass. A second pair of electrodes 38 are similarly positioned on opposite sides of the chamber 11 and near the upper end thereof to provide for separate control of the temperature of the glass in the upper portion of the chamber 11.

From the foregoing description it will be apparent that molten glass admitted into the sleeve 20 will pass by gravity through the sleeve and discharge through the openings 21 into the chamber 11 and the glass in the chamber 11 will discharge by gravity through the opening 35. The normal primary flow path of the molten glass through the homogenizer is that as indicated by the arrows on Fig. 1. Thus, it will be seen that the molten glass is retained in the homogenizer for but a short period of time and that the flow of the molten glass is substantially that of a straight line flow through the homogenizer. This provides for a minimum of stagnation of the molten glass in the homogenizer so that glass that discharges from the opening 35 is of the same character as that which was admitted to the homogenizer, only more thoroughly mixed. The curved wall section 14 adjacent the bottom wall of the chamber 11 which is in substantially radial spatial alignment with the flow of glass from the cylinder 20 into the discharge opening 35 eliminates stagnant corners of glass at the bottom of the chamber, thus insuring that the glass passing through the homogenizer will be actively moving and thereby prevent retention of glass in the homogenizer under heating conditions for a prolonged period of time which causes changes in the composition of the glass.

When the cylinder 20 is rotated within the body of glass in the chamber 11, the streams of molten glass flowing through the openings 21 substantially normal to the primary flow of glass through the homogenizer are drawn or strung out in a generally helical pattern which has its axis in the discharge opening 35. The dual movement to the flow of molten glass, that is axial of the cylinder 20 and radial or substantially normal thereto results in a thorough mixing and homogenizing of the glass as it passes from the cylinder 20 into the chamber 11 and thence into the discharge passage 35, the flow of the glass being continually forward or unidirectional in its movement through the homogenizer.

Since the cylinder 20 is continually rotated, any molten glass in the upper portion of chamber 11 is continually mixed because of the adhesion of the molten glass to the surface of the rotating cylinder tending to rotate the mass within the cylinder whereas the stationary wall of the chamber 11 tends to retard movement of the mass by the cylinder 20. Thus, there is a continuous shearing or stretching or drawing or mixing of the glass in the chamber 11 throughout the entire mass thereof which avoids stagnation of the glass in any part of the chamber.

Still further, the body of glass near the top portion of the chamber 11 provides a layer that protects the portion of the body of glass in the bottom part of the chamber 11 from contamination with atmospheric conditions. Thus, the glass flowing through the bottom portion of the chamber 11 is prevented from absorption of gas, particularly water vapor, which eliminates reboiling difficulties when melting the glass in subsequent manufacturing operations.

The temperature of the glass in the upper portion of the chamber 11 can be independently controlled by the electrodes 38 from the temperature of the glass in the bottom portion of the chamber 11 as controlled by the electrodes 37, whereby the fluidity of the glass in the upper portion of the chamber can be maintained somewhat greater than that in the lower portion of the chamber to provide for ease of liberation of gas from the molten glass. Also, this provides for a very slow intermixing of the molten glass from the upper portion of the chamber into the lower portion of the chamber to avoid complete stagnation of any glass in any part of the chamber.

The method of homogenizing the glass in a substantially straight line flow with a disturbance in the flow that is substantially normal to the flow results in a homogenized glass of extremely uniform character as there is a continuous helical mixing of a plurality of separate streams of molten glass as it passes from the cylinder 20 into the chamber 11 and concurrently moves forward to the discharge opening 35 and since there is no stagnant glass carried into the fresh glass moving through the homogenizer which would change the composition of the glass.

While the method and apparatus disclosed herein constitutes a preferred form of the invention, yet it will be understood that alternations can be made without departing from the spirit of the invention, and that all modifications that fall within the scope of the appended claims are intended to be included herein.

Having thus fully described my invention, what I claim as new and desire to secure by Letters Patent, is:

1. Apparatus for mixing molten glass to increase the homogeneity of the glass mixture, comprising, a receptacle for receiving and containing a body of molten glass, said receptacle having a centrally located discharge opening in the bottom wall thereof, a second receptacle positioned within said first receptacle axially of the discharge opening and having an open top forming an inlet opening for molten glass and a closed bottom, said second receptacle having the closed bottom in close proximity to said discharge opening and having a plurality of openings in the side wall thereof positioned in close proximity to the closed bottom of the receptacle, and means supporting said second receptacle relative to said first receptacle for rotation of said second receptacle within said first receptacle.

2. Apparatus for mixing molten glass to increase the homogeneity of the glass mixture, comprising, a receptacle having a substantially cylindrical chamber for receiving and containing a body of molten glass, said receptacle having a centrally located discharge opening in the bottom wall thereof from said chamber, a cylindrical open-topped receptacle positioned within said chamber with the bottom wall in close proximity to said discharge opening and with the open top forming an inlet opening for molten glass, means rotatably supporting said cylindrical receptacle for rotation thereof within said chamber, and a plurality of openings in the side wall of said cylindrical receptacle in close proximity to the bottom wall thereof.

3. Apparatus for mixing molten glass to increase the homogeneity of the glass mixture, comprising, a receptacle having a chamber for receiving and containing a body of molten glass, said receptacle having a centrally located discharge opening in the bottom wall thereof from said chamber, an open-topped receptacle positioned within said chamber with the bottom wall thereof in close proximity to the bottom wall of said chamber and with the open top forming an inlet opening for molten glass, means rotatably supporting said cylindrical receptacle for rotation thereof relative to said first receptacle, and a plurality of openings in the side wall of said open topped receptacle in close proximity to the bottom wall thereof for flow communication between said open-topped receptacle and said chamber said openings in said open-topped receptacle being positioned therein radially beyond the periphery of said discharge opening from said chamber.

4. Apparatus for mixing molten glass to increase the homogeneity of the glass mixture, comprising, a receptacle for receiving and containing a body of molten glass, said receptacle having a centrally located discharge opening in the bottom wall thereof, a second receptacle positioned within said first receptacle axially of the discharge opening and having an open top forming an inlet opening for molten glass and a closed bottom, said second receptacle having the closed bottom in close proximity to said discharge opening and having a plurality of openings in the side wall thereof positioned in close proximity to the closed bottom of the receptacle, means supporting said second receptacle relative to said first receptacle for rotation of said second receptacle within said first receptacle, said receptacles being coaxially aligned with said discharge opening, and electrical heating means within said first receptacle at opposite sides of said second receptacle and radially opposite said openings therein.

5. Apparatus for mixing molten glass to increase the homogeneity of the glass mixture, comprising, a receptacle for receiving and containing a body of molten glass, said receptacle having a centrally located discharge opening in the bottom wall thereof, a second receptacle positioned within said first receptacle axially of the discharge opening and having an open top forming an inlet opening for molten glass and a closed bottom, said second receptacle having the closed bottom in close proximity to said discharge opening and having a plurality of openings in the side wall thereof positioned in close proximity to the closed bottom of the receptacle, said openings in said open-topped receptacle being positioned therein radially beyond the periphery of said discharge opening from said chamber, means supporting said second receptacle relative to said first receptacle for rotation of said second receptacle within said first receptacle, said receptacles being coaxially aligned with said discharge opening, and electrical heating means within said first receptacle at opposite sides of said second receptacle equidistantly spaced from said second receptacle and radially opposite said openings therein.

6. The method of treating molten glass to increase the homogeneity of the glass as it flows to a discharge opening, which method comprises, flowing molten glass in a continuous body from an inlet to an outlet in a single forward direction toward the outlet, and producing in the continuous body during its forward flow an abrupt change in the direction of flow of the glass and simultaneously with said direction change exerting a shearing action on said glass in its forward movement to obtain mixing of the glass but without halting the general flow of the glass in the forward direction.

7. The method of treating molten glass to increase the homogeneity of the glass as it flows to a discharge opening, which method comprises, flowing molten glass in a continuous body from an inlet to an outlet in a single forward direction toward the outlet, and effecting a drawing action on a portion of the continuous body of the glass during its forward flow that is angular to the direction of the flow without halting the general forward flow of the glass, whereby to obtain mixing of the glass.

8. The method of treating molten glass to increase the homogeneity of the glass as it flows to a discharge opening, which method comprises, flowing molten glass in a continuous body from an inlet to an outlet in a single forward direction toward the outlet, and effecting a flow of the glass into a plurality of small streams without affecting the continuity of the continuous body with an abrupt change in the direction of flow when divided into the plurality of streams of glass and simultaneously with said direction change and said division exerting a shearing action on said glass to stretch out the streams without halting the general flow of the body of glass in its forward direction to the outlet.

9. The method of treating molten glass to increase the homogeneity of the glass as it flows to a discharge opening, which method comprises, flowing molten glass in a continuous body from an inlet to an outlet in a generally single forward direction toward the outlet, effecting a momentary division of the flow of molten glass into a plurality of streams by an abrupt change in the direction of flow of the molten glass and simultaneously with said direction change exerting a shearing action on said glass without affecting the continuity of the continuous body, causing the streams of molten glass to re-establish as a continuous body and therein draw out into the general form of a helix with continuous forward movement of the body of glass in the forward direction, whereby to obtain intimate mixing of the molten glass.

10. The method of treating molten glass to increase the homogeneity of the glass as it flows to a discharge opening, which method comprises, flowing a stream of molten glass into a receptacle that rotates within a chamber containing a body of molten glass from which the glass discharges from an opening aligned with the rotating receptacle, passing the molten glass from the receptacle into the chamber through a plurality of openings in the receptacle by an abrupt change in the direction of flow of the glass while continuously rotating the receptacle whereby to obtain a division of the glass into a plurality of small streams passing from the receptacle into the chamber and concurrently with said division into streams and said direction change exerting a shearing action on said glass and continuing flow of the molten glass in the forward direction toward the discharge opening whereby the streams of molten glass stretch out in the body of glass into the general form of a helix during the forward motion of the glass toward the discharge opening and thereby obtain intimate mixing of the glass.

11. The method of treating molten glass to increase the homogeneity of the glass as it flows to a discharge opening, which method comprises, flowing a stream of molten glass into a receptacle that rotates within a chamber containing a body of molten glass from which the glass discharges from an opening aligned with the rotating receptacle, passing the molten glass from the re-receptacle into the chamber through a plurality of openings in the receptacle by an abrupt change in the direction of flow of the glass while continuously rotating the receptacle whereby to obtain a division of the glass into a plurality of small streams passing from the receptacle into the chamber and concurrently with said division into streams and said direction change exerting a shearing action on said glass and continuing flow of the molten glass in the forward direction toward the discharge opening whereby the streams of molten glass stretch out into the general form of a helix in the forward motion of the glass toward the discharge opening and thereby obtain intimate mixing of the glass, and heating that portion of the glass undergoing movement from the receptacle to the chamber.

DOMINICK LABINO.

References Cited in the file of this patent

UNITED STATES PATENTS

| Number | Name | Date |
|---|---|---|
| 734,985 | Spindler | July 28, 1903 |
| 1,391,013 | Schwager | Sept. 20, 1921 |
| 1,872,664 | Brown | Apr. 23, 1932 |
| 2,040,789 | Honiss | May 12, 1936 |
| 2,113,963 | Morton | Apr. 12, 1938 |
| 2,144,470 | Wadsworth | Jan. 17, 1939 |
| 2,159,361 | Atkinson et al. | May 23, 1939 |
| 2,379,368 | Matuszak | June 26, 1945 |
| 2,520,577 | Tooley | Aug. 29, 1950 |
| 2,523,030 | Labino | Sept. 19, 1950 |

FOREIGN PATENTS

| Number | Country | Date |
|---|---|---|
| 367,614 | Great Britain | Feb. 25, 1932 |
| 688,267 | France | May 12, 1950 |